US010216656B2

(12) United States Patent
Hanscom et al.

(10) Patent No.: US 10,216,656 B2
(45) Date of Patent: Feb. 26, 2019

(54) CUT-THROUGH BUFFER WITH VARIABLE FREQUENCIES

(71) Applicant: International Business Machines Corporation, Armonk, NY (US)

(72) Inventors: Jeffrey C. Hanscom, Poughkeepsie, NY (US); Eric N. Lais, Georgetown, TX (US); John M. Pritz, Mercer Island, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 15/276,911

(22) Filed: Sep. 27, 2016

(65) Prior Publication Data

US 2018/0089114 A1    Mar. 29, 2018

(51) Int. Cl.
*G06F 3/00* (2006.01)
*G06F 13/16* (2006.01)
(Continued)

(52) U.S. Cl.
CPC ............ *G06F 13/1673* (2013.01); *G06F 5/06* (2013.01); *G06F 11/006* (2013.01);
(Continued)

(58) Field of Classification Search
CPC .. G06F 13/385; G06F 13/387; G06F 11/3485; G06F 11/3003; G06F 11/3041;
(Continued)

(56) References Cited

U.S. PATENT DOCUMENTS 4,945,548 A * 7/1990 Iannarone ................. G06F 5/14
                                                                    370/506
6,901,039 B1    5/2005 Sugie et al.
(Continued)

OTHER PUBLICATIONS

List of IBM Patents or Patent Applications Treated as Related, Aug. 8, 2017, 2 pages.
(Continued)

*Primary Examiner* — Tim T Vo
*Assistant Examiner* — Kim T Huynh
(74) *Attorney, Agent, or Firm* — Cantor Colburn LLP; Steven Chiu

(57) ABSTRACT

A system includes a cut-through buffer operable to be asynchronously read while being written at different clock frequencies. The system also includes a controller operatively connected to the cut-through buffer. The controller is operable to write one or more values into the cut-through buffer in a first clock domain and compare a number of values written into the cut-through buffer to a notification threshold. A notification indicator is passed from the first clock domain to a second clock domain based on determining that the number of values written into the cut-through buffer meets the notification threshold. Based on receiving the notification indicator, the cut-through buffer is read from the second clock domain continuously without pausing until the one or more values are retrieved and any additional values written to the cut-through buffer during the reading of the one or more values are retrieved.

15 Claims, 7 Drawing Sheets

(51) Int. Cl.
*G06F 13/40* (2006.01)
*G06F 13/42* (2006.01)
*G06F 11/00* (2006.01)
*G06F 5/06* (2006.01)

(52) U.S. Cl.
CPC ...... *G06F 13/1689* (2013.01); *G06F 13/4068* (2013.01); *G06F 13/4282* (2013.01)

(58) Field of Classification Search
CPC .... G06F 3/0653; G06F 11/3419; G06F 13/10; G05B 19/054; G05B 2219/1157
USPC ...................... 710/11–18, 305–306
See application file for complete search history.

(56) References Cited

U.S. PATENT DOCUMENTS

| | | | |
|---|---|---|---|
| 6,952,739 B2 | 10/2005 | Fritz et al. | |
| 7,042,891 B2 | 5/2006 | Oberman et al. | |
| 7,426,251 B1* | 9/2008 | Huang | H04L 7/042 375/219 |
| 7,761,682 B2* | 7/2010 | Barnum | G06F 13/1642 711/167 |
| 8,698,539 B1* | 4/2014 | Nayyar | G06F 1/04 327/291 |
| 2004/0028158 A1* | 2/2004 | Fujimori | H04B 10/291 375/350 |
| 2004/0028164 A1* | 2/2004 | Jiang | H04L 12/46 375/371 |
| 2007/0130372 A1* | 6/2007 | Irish | G06F 13/12 710/5 |
| 2009/0055677 A1* | 2/2009 | Chen | G06F 1/04 713/600 |
| 2013/0083043 A1* | 4/2013 | Carter | G06T 1/20 345/506 |
| 2013/0339558 A1* | 12/2013 | Zhu | G06F 9/3851 710/105 |
| 2015/0229576 A1* | 8/2015 | Baratam | H04L 47/6215 370/413 |
| 2018/0089114 A1* | 3/2018 | Hanscom | G06F 13/1673 |

OTHER PUBLICATIONS

U.S. Appl. No. 15/670,221, filed Aug. 7, 2017, Entitled: Multi-Source Data Insertion Using an Elastic FIFO, First Named Inventor: Jeffrey C. Hansom.
List of IBM Patents or Patent Applications Treated as Related, Oct. 20, 2016, 2 pages.
U.S. Appl. No. 15/272,858, filed Sep. 22, 2016, Entitled: Multi-Source Data Insertion Using an Elastic FIFO, First Named Inventor: Jeffrey C. Hansom.
U.S. Appl. No. 15/272,974, filed Sep. 22, 2016, Entitled: Processing of Inbound Back-To-Back Completions in a Communication System, First Named Inventor: Jeffrey C. Hansom.
U.S. Appl. No. 15/275,529, filed Sep. 26, 2016, Entitled: Multi-Packet Processing With Ordering Rule Enforcement, First Named Inventor: Jeffrey C. Hansom.
U.S. Appl. No. 15/275,531, filed Sep. 26, 2016, Entitled: Simultaneous Inbound Multi-Packet Processing, First Named Inventor: Jeffrey C. Hansom.
List of IBM Patents or Patent Applications Treated as Related, May 30, 2017, 2 pages.
U.S. Appl. No. 15/594,784, filed May 15, 2017, Entitled: Multi-Packet Processing With Ordering Rule Enforcement, First Named Inventor: Jeffrey C. Hansom.

* cited by examiner

CUT-THROUGH BUFFER WITH VARIABLE FREQUENCIES

BACKGROUND

Aspects are related generally to computer-based communication systems, and more specifically to a cut-through buffer crossing domains with variable frequencies in a computer system.

Peripheral component interconnect express (PCIe) is a component level interconnect standard that defines a bi-directional communication protocol for transactions between input/output (I/O) adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus.

Packets can be received and processed in different clock domains asynchronously. Managing an asynchronous boundary crossing through a buffer, where source and destination clock domains are variable, typically has a high degree of latency and complex handling logic. For example, data can be read faster than it is written, resulting in a potential underrun/read ahead condition. There must be guarantees that the read side will never underrun regardless of the read and write clock relationships. In some system designs, packets must be transmitted continuously once they are started with no pacing logic allowed. Thus, there is a need to reduce complexity and latency in asynchronous boundary crossings with variable frequencies in a computer system.

SUMMARY

According to one embodiment, a system includes a cut-through buffer operable to be asynchronously read while being written at different clock frequencies. The system also includes a controller operatively connected to the cut-through buffer. The controller is operable to write one or more values into the cut-through buffer in a first clock domain and compare a number of values written into the cut-through buffer to a notification threshold. A notification indicator is passed from the first clock domain to a second clock domain based on determining that the number of values written into the cut-through buffer meets the notification threshold. Based on receiving the notification indicator, the cut-through buffer is read from the second clock domain continuously without pausing until the one or more values are retrieved and any additional values written to the cut-through buffer during the reading of the one or more values are retrieved.

According to an embodiment, a method includes writing, by a controller, one or more values into a cut-through buffer in a first clock domain, where the cut-through buffer is operable to be asynchronously read while being written at different clock frequencies. A number of values written into the cut-through buffer is compared to a notification threshold. A notification indicator is passed from the first clock domain to a second clock domain based on determining that the number of values written into the cut-through buffer meets the notification threshold. Based on receiving the notification indicator, the cut-through buffer is read from the second clock domain continuously without pausing until the one or more values are retrieved and any additional values written to the cut-through buffer during the reading of the one or more values are retrieved.

According to an embodiment, a computer program product includes a computer readable storage medium having program instructions embodied therewith. The program instructions are executable by a processing circuit of a controller to cause the processing circuit to perform writing one or more values into a cut-through buffer in a first clock domain, where the cut-through buffer is operable to be asynchronously read while being written at different clock frequencies. The program instructions are further executable to compare a number of values written into the cut-through buffer to a notification threshold, and pass a notification indicator from the first clock domain to a second clock domain based on determining that the number of values written into the cut-through buffer meets the notification threshold. Based on receiving the notification indicator, the cut-through buffer is read from the second clock domain continuously without pausing until the one or more values are retrieved and any additional values written to the cut-through buffer during the reading of the one or more values are retrieved.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments provide buffer underrun prevention in cut-through buffer designs with variable read and write clock frequencies by applying a threshold on notification timing such that buffer reads can complete while avoiding underrun/read ahead. In a cut-through buffer, data values can be read out asynchronously while additional data values are written into the buffer. In embodiments, a notification threshold can be set, for instance, by software based on a clock ratio between read and write clock domains. The notification threshold can be adjusted to allow data reads to start before the data buffer completely fills. The notification threshold can also be adjusted to make the buffer behave as a store and forward design if desired. When the notification threshold hits (due to slower writes than reads), there is no pause during reading of the buffer.

Pointer passing across the clock domains can be implemented using gray codes to reduce the risk of address jumping such that successive addresses differ by a single bit. The gray code allows a "plus one" simple update across clock domains for data to be processed when a header is sent with a notification indication. Metadata can be included with the data values to identify an error condition for early termination. For example, to stop a bad read, the first bad value can be flagged on the write side of the buffer such that the read side need not continue reading errant values from the buffer once it is known that at least one bad value has been received.

Figure 1:
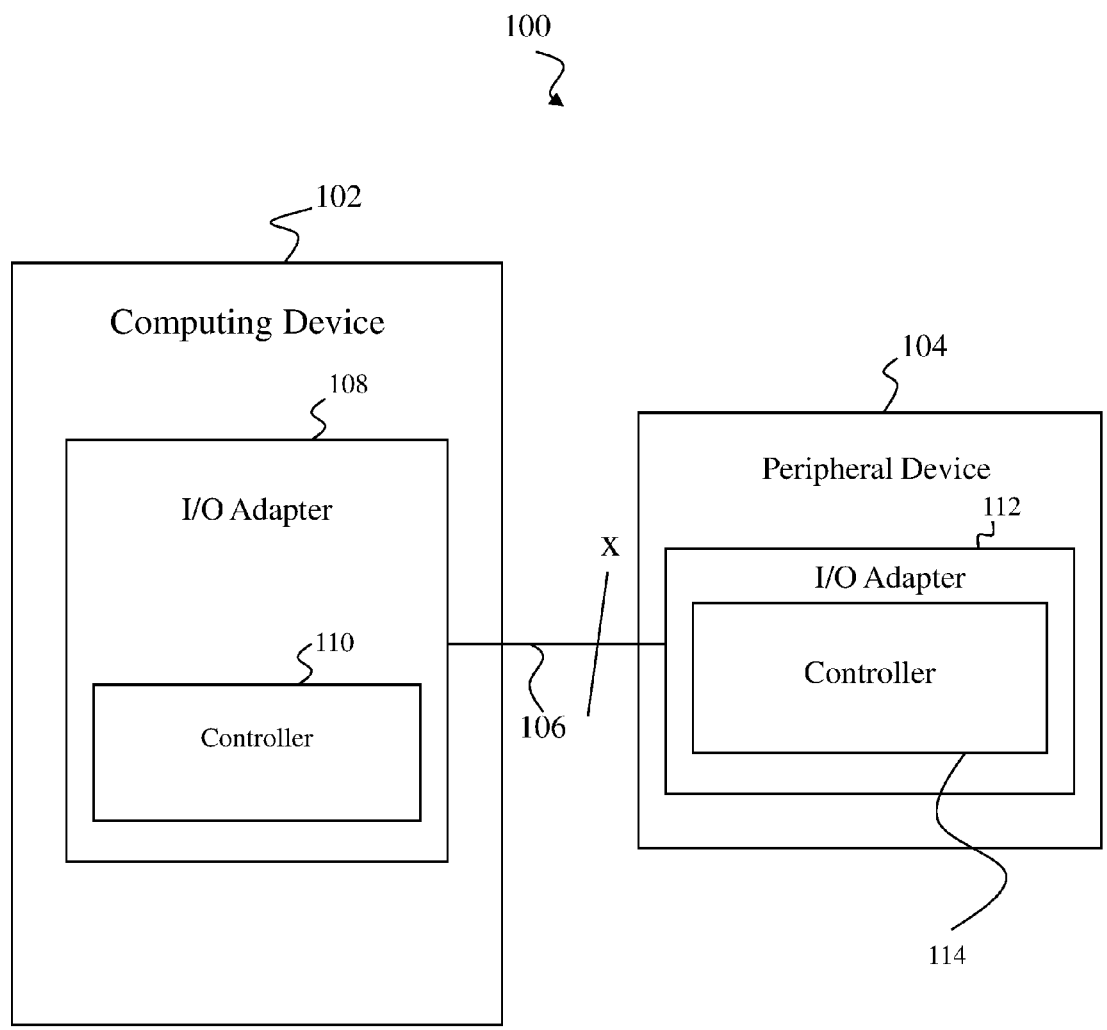
FIG. 1 illustrates a system in accordance with an embodiment.

FIG. 1 illustrates a system 100 on which embodiments may operate. The system 100 includes a computing device 102 and a peripheral device 104. The computing device 102 may be any type of computing device, such as, for example, a personal computer or a server. The computing device 102 performs operations and generates commands and data for transmission to the peripheral device 104. The computing device 102 may be referred to herein as a "root" or a "root complex". The peripheral device 104 may be any type of device capable of receiving commands and data from the computing device 102. For example, the peripheral device 104 may be a monitor, printer, memory unit, or the like.

The computing device 102 and the peripheral device 104 are coupled to one another by a communications link 106. In one embodiment, the communications link 106 may be a PCI Express link. As discussed, a PCI Express link (or bus) is built around pairs of serial (1-bit), unidirectional point-to-point connections also known as "lanes". The number of lanes can be variable and is indicated by the "x" related to the communications link 106.

In more detail, the computing device 102 may include an input/output (I/O) adapter 108 that allows for the physical connection to the communications link 106. The I/O adapter 108 may be operatively connected to a controller 110. In general, the controller 110 serves to control the operation of the I/O adapter 108. The controller 110 can be integrally formed or separate from the I/O adapter 108. In more detail, the controller 110 controls the creation, transmission, and reception of data packets transferred between the computing device 102 and the peripheral device 104 over the communications link 106. The controller 110 may also handle the creation and transmission of flow control credits and transaction layer packets, among other things. In embodiments, the I/O adapter 108 can be a PCIe adapter. The controller 110 may include one or more processing circuits that can be configured to execute processes as further described herein based on program instructions that establish configuration, layout, timing, and/or other functional characteristics of the controller 110 as parallel and/or sequential operations.

The peripheral device 104 may also include an I/O adapter 112 and a controller 114. The I/O adapter 112 may be operatively connected to the controller 114 of the peripheral device 104. In general, the controller 114 serves to control the operation of the I/O adapter 112. The controller 114 can be integrally formed or separate from the I/O adapter 112. In more detail, the controller 114 controls the creation, transmission, and reception of data packets transferred between the peripheral device 104 and the computing device 102 over the communications link 106. The controller 114 may also handle the creation and transmission of flow control credits and transaction layer packets, among other things. In embodiments, the I/O adapter 112 can be a PCIe adapter. The controller 114 may include one or more processing circuits that can be configured to execute processes as further described herein based on program instructions that establish configuration, layout, timing, and/or other functional characteristics of the controller 114 as parallel and/or sequential operations.

Figure 2:
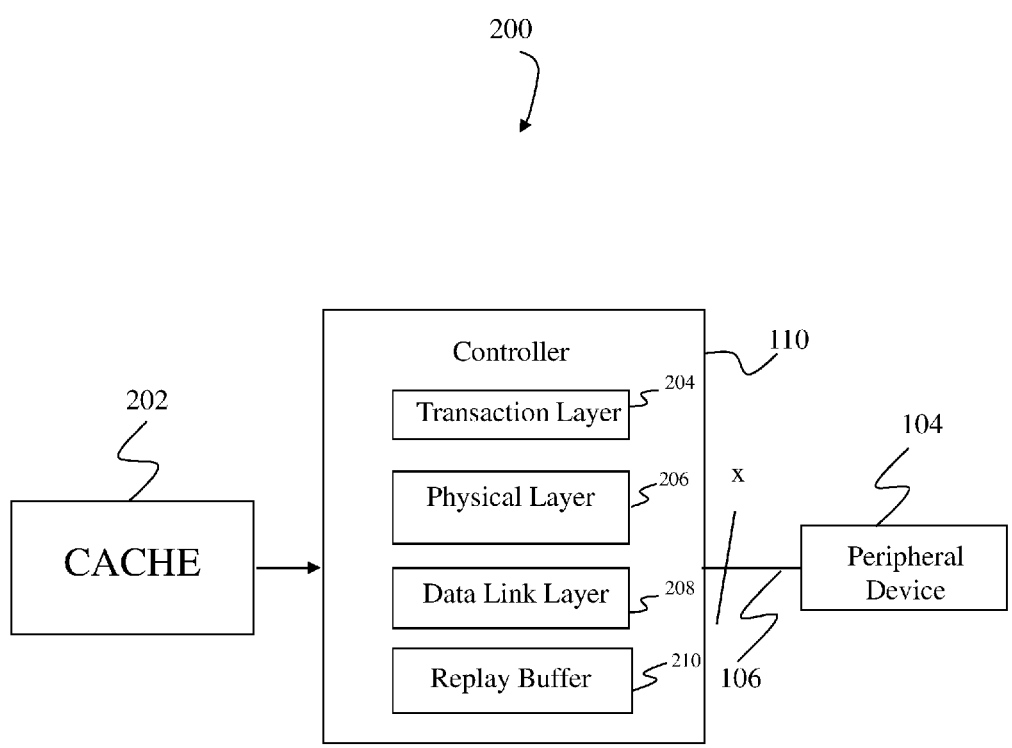
FIG. 2 illustrates a more detailed depiction of a portion of the system shown in FIG. 1 in accordance with an embodiment.

FIG. 2 depicts a block diagram of a portion of the system 100 shown in FIG. 1 in more detail as system 200. In particular, the system 200 includes a cache 202 coupled to controller 110. Information and commands to be transferred from the computing device 102 (FIG. 1) can be stored in the cache 202. The controller 110 handles the transmission of information to the peripheral device 104 via the communications link 106.

The controller 110 can implement, among other things, the PCI Express protocol. In addition, the controller 110 is configured to implement some or all of the aspects of embodiments.

The PCI Express protocol defines a transaction layer 204, a data link layer 208, and a physical layer 206. These layers 204-208 may also be present in the peripheral device 104. As shown, the controller 110 also includes a replay buffer 210. In general, the replay buffer 210 stores packets that have been sent by the controller 110 to the peripheral device 104 until the peripheral device 104 acknowledges receipt of the packets with a defined "ACK" indicator. In the event that a receipt is not acknowledged, one or more packets can be resent from the replay buffer 210.

The transaction layer 204 assembles packets of transaction requests, such as reads and writes, from the computing device 102 (FIG. 1). In common usage, these requests may be said to be received from the "core". Header information is added to the transaction requests, to produce transaction layer packets (TLPs). The data link layer 208 applies a data protection code, such as a cyclic redundancy check (CRC), and assigns a sequence number to each TLP. At the physical layer 206, the TLP is framed and converted to a serialized format, then is transmitted across the communications link 106 at a frequency and width compatible with the peripheral device 104.

At the peripheral device 104, the process is reversed. The physical layer converts the serialized data back into packet form, and stores the extracted TLP in memory at the data link layer. The data link layer verifies the integrity of the received TLP, such as by performing a CRC check of the packet, and also confirms the sequence number of the packet. After both checks are performed, the TLP, excluding the sequence number and the data link layer CRC, is forwarded to the transaction layer. The transaction layer disassembles the packet into information (e.g., read or write requests) that is deliverable to the device core. The transaction layer also detects unsupported TLPs and may perform its own data integrity check. If the packet transmission fails, the data link layer requests retransmission of the TLP from the replay buffer 210, known as a link layer retry (LLR).

Figure 3:
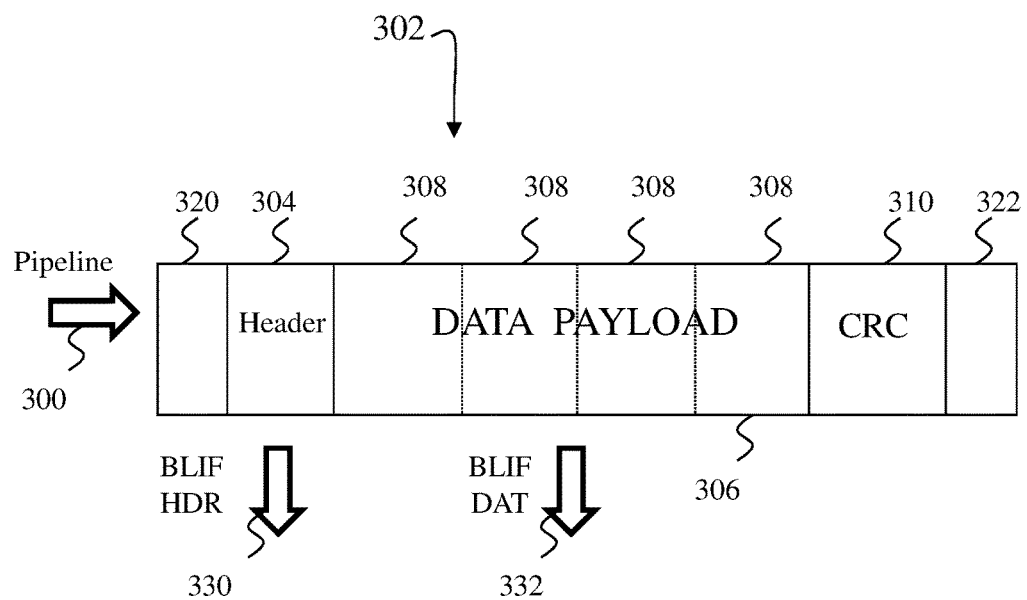
FIG. 3 illustrates an example of a packet that is received and processed in accordance with an embodiment.

FIG. 3 illustrates a packet received and processed in accordance with an embodiment. A packet 302 can be received on a pipeline 300 in a single clock cycle or spread across multiple clock cycles. The packet 302 can include a header portion 304, a payload portion 306, and cyclical redundancy check (CRC) portion 310 used for error detection and correction. The packet 302 may also include framing symbols marking the beginning 320 and the end 322 of the first packet 302. The payload portion 306 can be divided by multiple boundaries 308. Each boundary 308 can be a fixed distance from its nearest neighbor. In one embodiment, the distance between each boundary 308 is the width of the interface supplying the data.

The header portion 304 of the packet 302 can be routed through a buffer layer header interface 330 for a downstream use that may be a 16 byte wide bus. The payload portion 306 of the packet 302 can be routed through a buffer layer data interface 332 for a downstream use that may be a 32 byte wide bus. The downstream use may include further buffering in local memory of the computing device 102 of FIG. 1, for instance. The header portion 304 can provide processing and formatting information relative to the payload portion 306.

Figure 4:
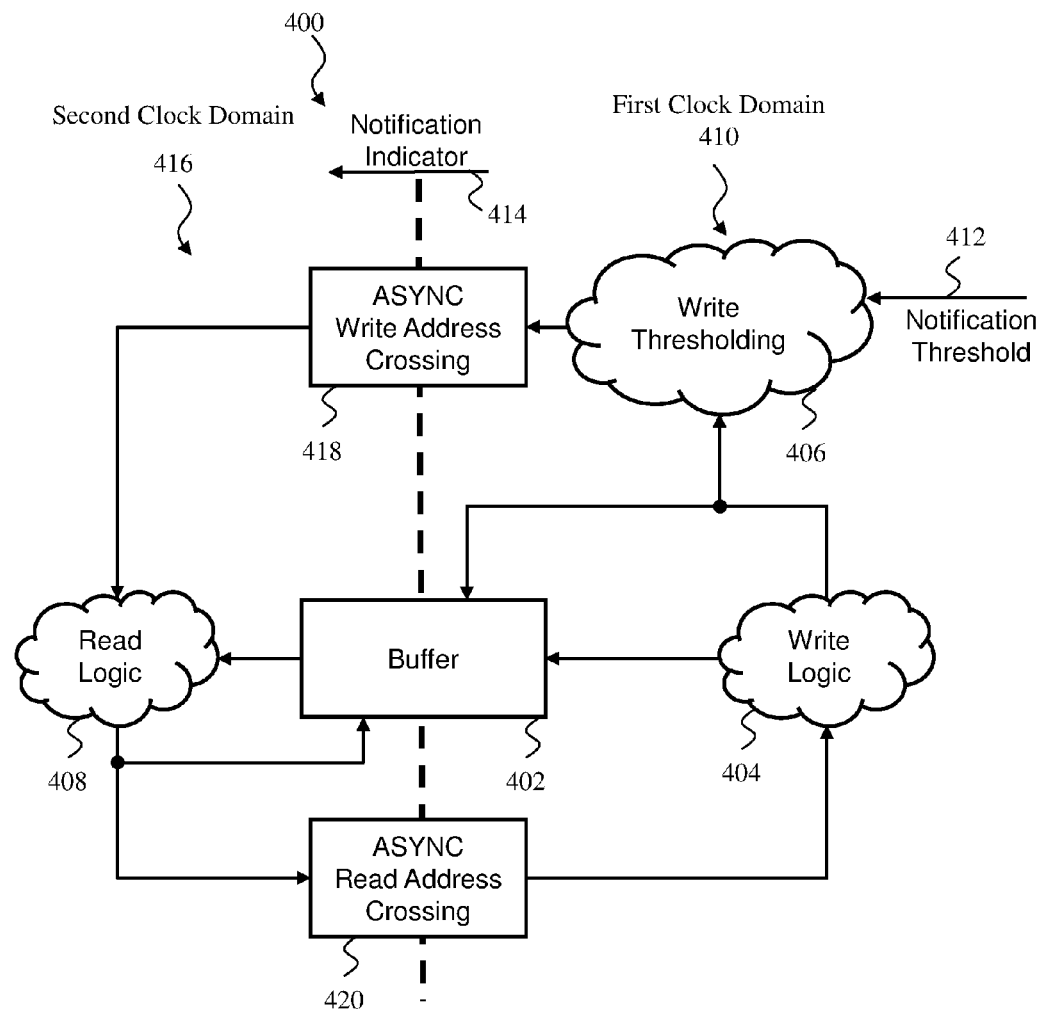
FIG. 4 illustrates a system for asynchronous boundary crossing using a cut-through buffer in accordance with an embodiment.

FIG. 4 illustrates a system 400 that includes a cut-through buffer 402 operable to be asynchronously read while being written at different clock frequencies. A controller, such as controller 110 of FIG. 1, can be operatively connected to the cut-through buffer 402. For example, the controller 110 can include write logic 404, write thresholding 406, and read logic 408. The controller 110 can write one or more values into the cut-through buffer 402 in a first clock domain 410 using the write logic 404. The controller 110 can use the write thresholding 406 to compare a number of values written into the cut-through buffer 402 to a notification threshold 412. A notification indicator 414 can be passed from the first clock domain 410 to a second clock domain 416 based on determining that the number of values written into the cut-through buffer 402 meets the notification threshold 412. Based on receiving the notification indicator 414, the read logic 408 can read the cut-through buffer 402 from the second clock domain 416 continuously without pausing until the one or more values are retrieved and any additional values written to the cut-through buffer 402 during the reading of the one or more values are retrieved. For instance, the write logic 404 can continually write to the cut-through buffer 402 while the read logic 408 waits until a sufficient number of values have been written before performing a continuous read operation of the cut-through buffer 402. The write logic 404 can continue with writing additional values to the cut-through buffer 402 while the read logic 408 reads the older values.

The notification indicator 414 can be a write address of the one or more values written into the cut-through buffer 402, where the notification indicator 414 passes through an asynchronous write address crossing 418. The controller 110 is operable to pass a read address from the second clock domain 416 to the first clock domain 410 as each of the values is read from the cut-through buffer 402 using an asynchronous read address crossing 420. The write address and the read address can each be encoded as gray codes to pass between the first clock domain 410 and the second clock domain 416 with successive addresses differing by a single bit. The read address provided from the read logic 408 to the write logic 404 can be used for error checking and to ensure that the read logic 408 is keeping pace relative to the write logic 404.

The notification threshold 412 can be set based on a clock frequency ratio of the first clock domain 410 to the second clock domain 416. The controller 110 can pass metadata identifying an error condition from the first clock domain 410 to the second clock domain 416. The controller 110 is operable to terminate the reading of the cut-through buffer 402 prior to completion based on receiving metadata identifying an error condition in the second clock domain 416.

Figure 5:
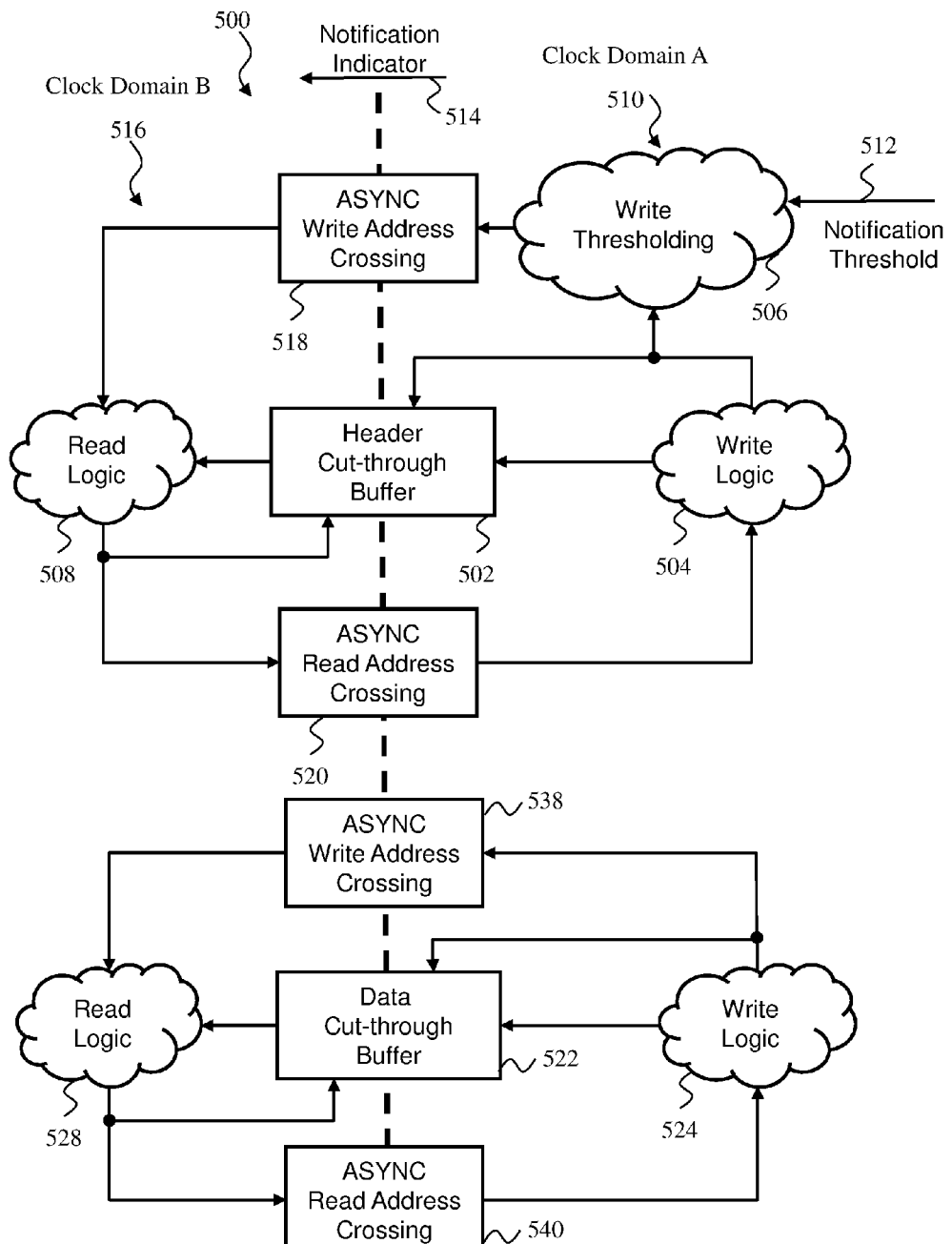
FIG. 5 illustrates a system for asynchronous boundary crossing using multiple cut-through buffers in accordance with an embodiment.

The metadata can be from the header portion 304 of a packet 302, with separate cut-through buffers for header and payload data as further depicted with respect to the example of FIG. 5.

FIG. 5 illustrates a system 500 that includes a header cut-through buffer 502 operable to be asynchronously read while being written at different clock frequencies. A controller, such as controller 110 of FIG. 1, can be operatively connected to the header cut-through buffer 502. For example, the controller 110 can include write logic 504, write thresholding 506, and read logic 508. Similar to the system 400 of FIG. 4, the controller 110 can write one or more values into the header cut-through buffer 502 in a first clock domain 510 using the write logic 504. The controller 110 can use the write thresholding 506 to compare a number of header values written into the header cut-through buffer 502 to a notification threshold 512. A notification indicator 514 can be passed from the first clock domain 510 to a second clock domain 516 based on determining that the number of header values written into the header cut-through buffer 502 meets the notification threshold 512. Based on receiving the notification indicator 514, the read logic 508 can read the cut-through buffer 502 from the second clock domain 516 continuously without pausing until the one or more header values are retrieved and any additional header values written to the header cut-through buffer 502 during the reading of the one or more values are retrieved.

The notification indicator 514 can be a write address of the one or more header values written into the header cut-through buffer 502, where the notification indicator 514 passes through an asynchronous write address crossing 518. The controller 110 is operable to pass a read address from the second clock domain 516 to the first clock domain 510 as each of the header values is read from the header cut-through buffer 502 using an asynchronous read address crossing 520. The write address and the read address can each be encoded as gray codes to pass between the first clock domain 510 and the second clock domain 516 with successive addresses differing by a single bit. The read address provided from the read logic 508 to the write logic 504 can be used for error checking and to ensure that the read logic 508 is keeping pace relative to the write logic 504.

With respect to the example of FIG. 3, a packet 302 can include a payload portion 306 that is larger than the header portion 304. Timing of the system 500 of FIG. 5 can be established such that data from the payload portion 306 can be passed from the first clock domain 510 to the second clock domain 516 using a data cut-through buffer 522 as controlled by write logic 524 and read logic 528 without the need for thresholding such as the write thresholding 506. The data cut-through buffer 522 is operable to buffer values from the payload portion 306 of the packet 302 (e.g., as received on buffer layer data interface 332) in parallel with buffering of the header portion 304 in the header cut-through buffer 502 (e.g., as received on buffer layer header interface 330). The notification threshold 512 can delay reading of the header cut-through buffer 502 without delaying reading of the data cut-through buffer 522. A write address of the one or more data values written into the data cut-through buffer 522 can be passed through an asynchronous write address crossing 538 to the read logic 528, and a read address of data values read from the data cut-through buffer 522 can be passed through an asynchronous read address crossing 540 to the write logic 524. The write address and the read address of the data cut-through buffer 522 can each be encoded as gray codes to pass between the first clock domain 510 and the second clock domain 516 with successive addresses differing by a single bit.

Figure 6:
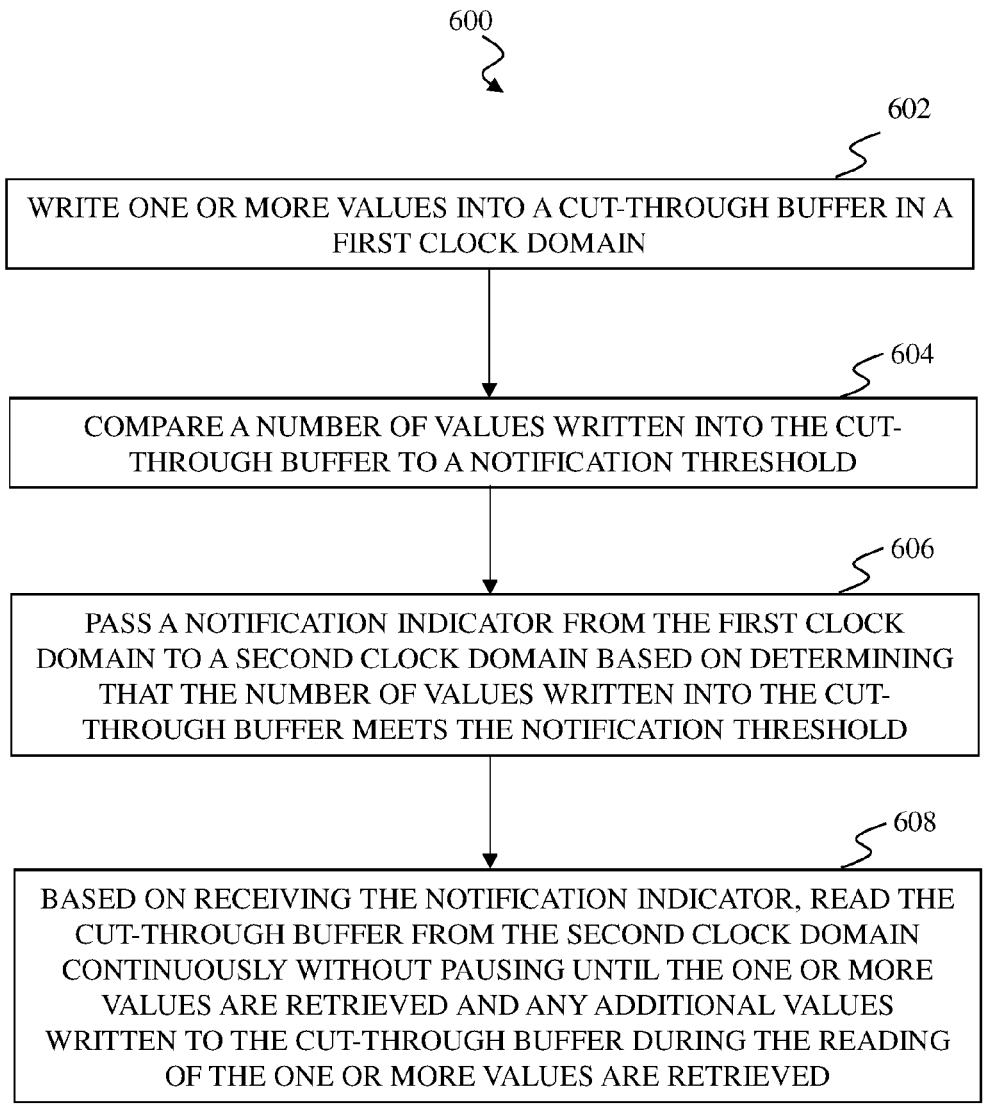
FIG. 6 illustrates a process flow in accordance with an embodiment.

Turning now to FIG. 6, a flow diagram of a process 600 is generally shown in accordance with an embodiment. The process 600 is described with reference to FIGS. 1-6 and may include additional steps beyond those depicted in FIG. 6. Although described in reference to controller 110, it will be understood that the process 600 can be performed by other controllers, such as controller 114. The controller 110 can implement the process 600 using a combination of the logic and thresholding of FIGS. 4 and/or 5. A general example is described with respect to FIG. 6. The process 600 can be incorporated in the I/O adapters 108 and/or 112 of FIG. 1 or in other system elements with asynchronous boundary crossings.

At block 602, the controller 110 writes one or more values into a cut-through buffer 402 in a first clock domain 410. At block 604, the controller 110 compares a number of values written into the cut-through buffer 402 to a notification threshold 412. At block 606, the controller 110 passes a notification indicator 414 from the first clock domain 410 to a second clock domain 416 based on determining that the number of values written into the cut-through buffer 402 meets the notification threshold 412. At block 608, based on receiving the notification indicator 414, the controller 110 reads the cut-through buffer 402 from the second clock domain 416 continuously without pausing until the one or more values are retrieved and any additional values written to the cut-through buffer 402 during the reading of the one or more values are retrieved.

The process 600 can be performed using the system 500 of FIG. 5, where the header cut-through buffer 502 is an embodiment of the cut-through buffer 402 of FIG. 4, the notification threshold 512 and notification indicator 514 are embodiments of the notification threshold 412 and notification indicator 414 of FIG. 4, and the first and second clock domains 510, 516 are embodiments of the first and second clock domains 410, 416 of FIG. 4.

Figure 7:
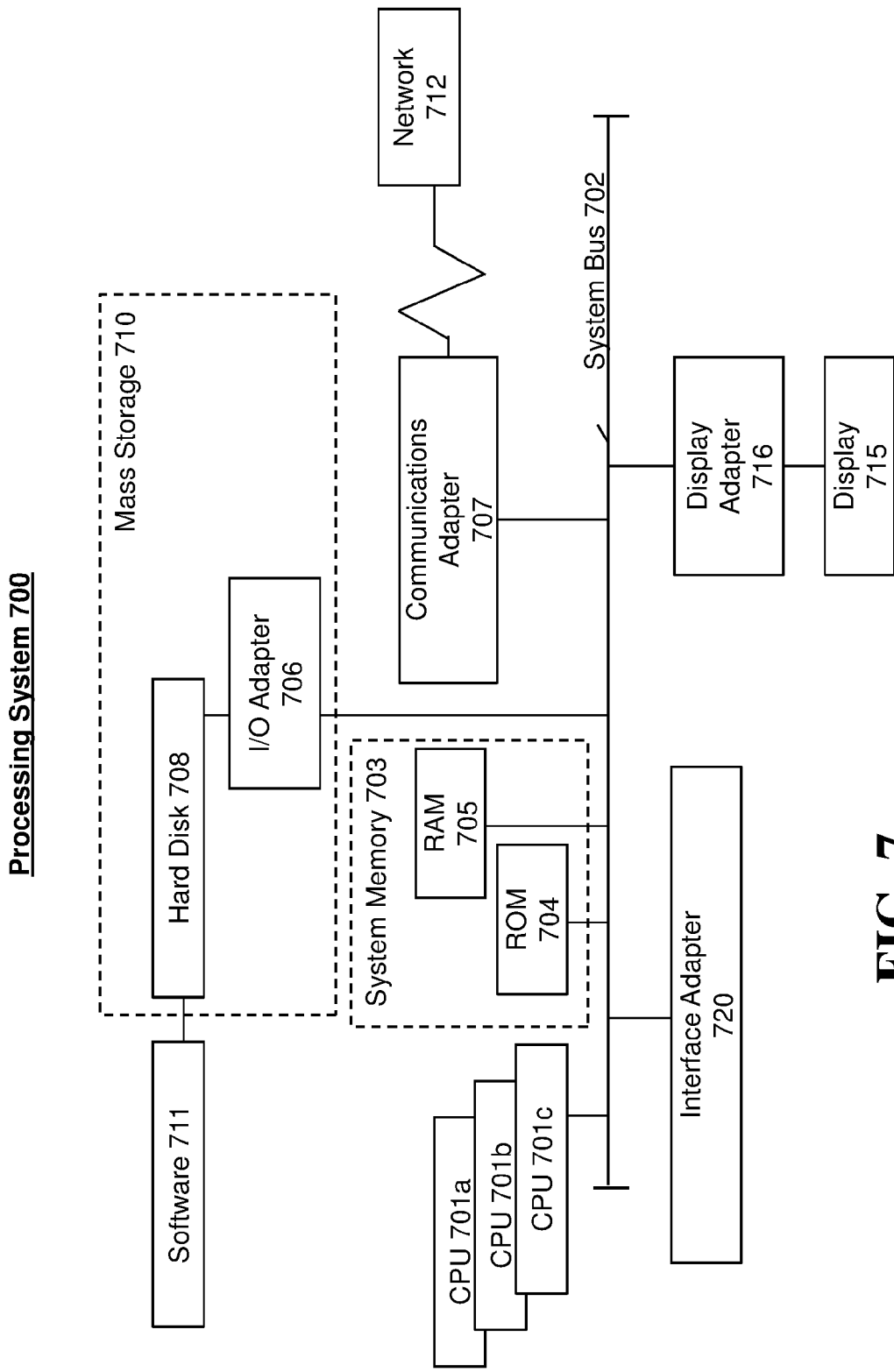
FIG. 7 illustrates a processing system in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701 can be an embodiment of the computing device 102 of FIG. 1. The processors 701, also referred to as processing circuits, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Alternatively, the I/O adapter 706 and/or the communications adapter 707 can be embodiments of the I/O adapter 108 or I/O adapter 112. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the process flow 600 of FIG. 6. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include protocols, such as PCIe. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

Technical effects and benefits include reduced latency with a cut-through buffer in a variable frequency design. Embodiments are programmable to allow both read and write clocks to change without requiring new logic to handle the different frequencies.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a header cut-through buffer operable to be asynchronously read while being written at different clock frequencies, wherein the header cut-through buffer is operable to buffer values from a header portion of a packet;
    a data cut-through buffer operable to buffer values from a payload portion of the packet in parallel with the header cut-through buffer; and
    a controller operatively connected to the header cut-through buffer and the data cut-through buffer, the controller operable to perform:
        writing one or more values into the header cut-through buffer in a first clock domain, wherein the data cut-through buffer is written in the first clock domain;

comparing a number of values written into the header cut-through buffer to a notification threshold;
passing a notification indicator from the first clock domain to a second clock domain based on determining that the number of values written into the header cut-through buffer meets the notification threshold; and
based on receiving the notification indicator, reading the header cut-through buffer from the second clock domain continuously without pausing until the one or more values are retrieved and any additional values written to the header cut-through buffer during the reading of the one or more values are retrieved, wherein the data cut-through buffer is read in the second clock domain, and the notification threshold delays reading of the header cut-through buffer without delaying reading of the data cut-through buffer.

2. The system of claim 1, wherein the system is part of a peripheral component interconnect express (PCIe) adapter.

3. The system of claim 1, wherein the notification indicator is a write address of the one or more values written into the header cut-through buffer, and the controller is operable to pass a read address from the second clock domain to the first clock domain as each of the values is read from the header cut-through buffer.

4. The system of claim 3, wherein the write address and the read address are each encoded as gray codes to pass between the first clock domain and the second clock domain with successive addresses differing by a single bit.

5. The system of claim 1, wherein the notification threshold is set based on a clock frequency ratio of the first clock domain to the second clock domain.

6. The system of claim 1, wherein the controller is operable to pass metadata identifying an error condition from the first clock domain to the second clock domain, and the controller is operable to terminate the reading of the header cut-through buffer prior to completion based on receiving the metadata identifying the error condition in the second clock domain.

7. A method comprising:
writing, by a controller, one or more values into a header cut-through buffer in a first clock domain, wherein the header cut-through buffer is operable to be asynchronously read while being written at different clock frequencies, and the header cut-through buffer is operable to buffer values from a header portion of a packet;
buffering values from a payload portion of the packet in a data cut-through buffer in parallel with the header cut-through buffer, wherein the data cut-through buffer is written in the first clock domain;
comparing a number of values written into the header cut-through buffer to a notification threshold;
passing a notification indicator from the first clock domain to a second clock domain based on determining that the number of values written into the header cut-through buffer meets the notification threshold; and
based on receiving the notification indicator, reading the header cut-through buffer from the second clock domain continuously without pausing until the one or more values are retrieved and any additional values written to the header cut-through buffer during the reading of the one or more values are retrieved, wherein the data cut-through buffer is read in the second clock domain, and the notification threshold delays reading of the header cut-through buffer without delaying reading of the data cut-through buffer.

8. The method of claim 7, wherein the controller, the header cut-through buffer, and the data cut-through buffer are components of a peripheral component interconnect express (PCIe) adapter.

9. The method of claim 7, wherein the notification indicator is a write address of the one or more values written into the header cut-through buffer, and further comprising passing a read address from the second clock domain to the first clock domain as each of the values is read from the header cut-through buffer.

10. The method of claim 9, further comprising encoding the write address and the read address as gray codes to pass between the first clock domain and the second clock domain with successive addresses differing by a single bit.

11. The method of claim 7, further comprising setting the notification threshold based on a clock frequency ratio of the first clock domain to the second clock domain.

12. The method of claim 7, further comprising:
passing metadata identifying an error condition from the first clock domain to the second clock domain; and
terminating the reading of the header cut-through buffer prior to completion based on receiving the metadata identifying the error condition in the second clock domain.

13. A computer program product comprising a non-transitory computer readable storage medium having program instructions embodied therewith, the program instructions executable by a processing circuit of a controller to cause the processing circuit to perform:
writing one or more values into a header cut-through buffer in a first clock domain, wherein the header cut-through buffer is operable to be asynchronously read while being written at different clock frequencies, and the header cut-through buffer is operable to buffer values from a header portion of a packet;
buffering values from a payload portion of the packet in a data cut-through buffer in parallel with the header cut-through buffer, wherein the data cut-through buffer is written in the first clock domain;
comparing a number of values written into the header cut-through buffer to a notification threshold;
passing a notification indicator from the first clock domain to a second clock domain based on determining that the number of values written into the header cut-through buffer meets the notification threshold; and
based on receiving the notification indicator, reading the header cut-through buffer from the second clock domain continuously without pausing until the one or more values are retrieved and any additional values written to the header cut-through buffer during the reading of the one or more values are retrieved, wherein the data cut-through buffer is read in the second clock domain, and the notification threshold delays reading of the header cut-through buffer without delaying reading of the data cut-through buffer.

14. The computer program product of claim 13, wherein the notification indicator is a write address of the one or more values written into the header cut-through buffer, and the program instructions further cause the processing circuit to pass a read address from the second clock domain to the first clock domain as each of the values is read from the header cut-through buffer.

15. The computer program product of claim 13, wherein the program instructions further cause the processing circuit to pass metadata identifying an error condition from the first clock domain to the second clock domain, and the controller is operable to terminate the reading of the header cut-through buffer prior to completion based on receiving the metadata identifying the error condition in the second clock domain.

* * * * *